US011299658B2

(12) United States Patent
Mania et al.

(10) Patent No.: US 11,299,658 B2
(45) Date of Patent: Apr. 12, 2022

(54) CONDENSATION-CURABLE POLYETHERSILICONE TILE ADHESIVES

(71) Applicant: WACKER CHEMIE AG, Munich (DE)

(72) Inventors: Daniel J. Mania, Saline, MI (US); Jerry Havens, Tecumseh, MI (US)

(73) Assignee: WACKER CHEMIE AG, Munich (DE)

( * ) Notice: Subject to any disclaimer, the term of this patent is extended or adjusted under 35 U.S.C. 154(b) by 134 days.

(21) Appl. No.: 16/345,801

(22) PCT Filed: Oct. 28, 2016

(86) PCT No.: PCT/IB2016/056529
§ 371 (c)(1),
(2) Date: Apr. 29, 2019

(87) PCT Pub. No.: WO2018/078423
PCT Pub. Date: May 3, 2018

(65) Prior Publication Data
US 2019/0249048 A1    Aug. 15, 2019

(51) Int. Cl.
C08K 3/34        (2006.01)
C09J 171/02      (2006.01)
C08L 71/00       (2006.01)
C08G 18/48       (2006.01)
C08G 18/71       (2006.01)
C08G 65/336      (2006.01)
C09J 171/00      (2006.01)
C09J 201/10      (2006.01)
C09J 5/00        (2006.01)
C09J 11/04       (2006.01)
C09J 11/06       (2006.01)
C09J 183/04      (2006.01)
C08L 101/10      (2006.01)
C08G 65/333      (2006.01)

(52) U.S. Cl.
CPC ............ C09J 171/02 (2013.01); C08G 18/48 (2013.01); C08G 18/718 (2013.01); C08G 65/336 (2013.01); C08L 71/00 (2013.01); C09J 5/00 (2013.01); C09J 11/04 (2013.01); C09J 11/06 (2013.01); C09J 171/00 (2013.01); C09J 183/04 (2013.01); C09J 201/10 (2013.01); C08G 65/33348 (2013.01); C08L 101/10 (2013.01); C09J 2471/00 (2013.01); C09J 2483/00 (2013.01)

(58) Field of Classification Search
CPC ...... C09J 183/06; C09J 201/10; C09J 171/02; C08K 3/36; C08L 183/06
See application file for complete search history.

(56) References Cited

U.S. PATENT DOCUMENTS

| 6,884,852 | B1  |    | 4/2005  | Klauck et al. |             |
|-----------|-----|----|---------|---------------|-------------|
| 9,856,173 | B2  | *  | 1/2018  | Mania         | C08G 77/46  |
| 10,030,122| B2  | *  | 7/2018  | Mania         | C08G 65/336 |
| 2005/0119436 | A1 |  | 6/2005  | Ziche et al.  |             |
| 2007/0167598 | A1 |  | 7/2007  | Stanjek et al.|             |
| 2010/0016537 | A1 |  | 1/2010  | Bamann et al. |             |
| 2013/0310488 | A1 | * | 11/2013 | Zeh           | C04B 20/002 |
|           |     |    |         |               | 524/5       |
| 2014/0155545 | A1 | * | 6/2014  | Stanjek       | C04B 26/32  |
|           |     |    |         |               | 524/588     |
| 2015/0007938 | A1 |  | 1/2015  | Stanjek et al.|             |
| 2015/0083324 | A1 |  | 3/2015  | Stanjek et al.|             |
| 2016/0229749 | A1 | * | 8/2016  | Mania         | C08G 59/4057|
| 2016/0230043 | A1 | * | 8/2016  | Mania         | C08K 5/5419 |

FOREIGN PATENT DOCUMENTS

| EP | 1093482  | B1 |   | 8/2004  |
|----|----------|----|---|---------|
| EP | 1641854  | B1 |   | 1/2007  |
| EP | 1535940  | B1 |   | 6/2007  |
| EP | 1896523  | B1 |   | 10/2010 |
| WO | 2016/128283 |  | * | 8/2016  |
| WO | 16128263 | A1 |   | 8/2016  |
| WO | 16128283 | A1 |   | 8/2016  |

OTHER PUBLICATIONS

GENIOSIL ®—a registered TM of Wacker Chemie AG, Munich, Germany. STP-E Product Information No. 6975e/03.13.
Tile Adhesives—VINNAPAS ®—a registered TM of Wacker Chemie AG, Munich, Germany. Product Information No. 7694e/03.19.
Tile—Wikipedia, download Dec. 10, 2020. https:/en.wikipedia.org/wiki/Tile.

* cited by examiner

Primary Examiner — Margaret G Moore
(74) Attorney, Agent, or Firm — Brooks Kushman P.C.

(57) ABSTRACT

Tiles are adhesively bonded to substrates such as kitchen or bathroom walls by a process in which a tile adhesive is used, the tile adhesive being a one component RTV-1 moisture-curable tile adhesives having properties superior to conventional cementitious and RTU tile adhesives, which contain at least one low viscosity alkoxysilyl-functional polymer, a silicone resin, an aminoalkyl-functional alkoxysilane or partial hydrolysate thereof, and in excess of 60 weight percent mineral filler, of which at least 50 weight percent is a non-reinforcing filler.

18 Claims, No Drawings

CONDENSATION-CURABLE POLYETHERSILICONE TILE ADHESIVES

CROSS REFERENCE TO RELATED APPLICATIONS

This application is the U.S. National Phase of PCT Application No, PCT/IB2016/056529 filed on Oct. 28, 2016, the disclosure of which is incorporated in its entirety by reference herein.

BACKGROUND OF THE INVENTION

1. Field of the Invention

The field of the invention is condensation-curable polyethersilicone tile adhesives.

2. Description of the Related Art

Tile adhesives for use in securing ceramic tiles and other inorganic facing materials such as glass, marble, granite, and the like (all defined herein as "tile") have been known since pre-Roman times. Until relatively recently, such tile adhesives have been based on hydraulically curable inorganic materials such as pozolanic cements, Portland cements, and less frequently, lime or gypsum. Such adhesives continue to be used to this day. Advantages of such tile adhesives are their low cost, coupled with an enormous amount of experience with their use. However, such inorganic tile adhesives have numerous disadvantages as well. For example, their adhesion is limited, and while they have adequate compressive strength, they have little tensile strength. Moreover, inorganic tile adhesives tend to be brittle, and can tolerate but limited flexion. The adhesives exhibit shrinkage, and are essentially hydrophilic, easily absorbing water which not only reduces their physical properties but also allows for the growth of microorganisms, particularly algae, fungi, and mold. These adhesives must be mixed on site and have limited "pot life."

Over the last few decades, manufacturers have attempted to substitute polymer-based adhesives to fulfill the long sought need for adhesives with superior adhesion, greater flexibility, and greater hydrophobicity; in other words to eliminate the deficiencies of inorganic tile adhesives discussed previously. However, these efforts have not been very successful.

Mastics of a variety of resins have been employed, for example. However, these contain organic solvents whose evaporation presents ecological and toxicological problems. Moreover, their cure, since the mastics are positioned between the wall or floor and a relatively impervious tile, is slow. Over time, following complete loss of solvent, the mastic may become brittle, losing adhesive strength and tensile strength. Thus, mastic-based adhesives have had little commercial success.

Two-part and three-part epoxy resin-based tile adhesives have also been used. Such tile adhesives exhibit excellent adhesion, but the use of two- or three-part systems is inconvenient, and mixing is both tedious and very messy. Experienced installers are generally required. Moreover, the formulations are relatively expensive and suffer from a very short pot life, requiring mixing only quantities which can be used over a relatively short time period.

RTU ("ready to use") tile adhesives based principally on emulsion polymers such as acrylic latexes have also been promoted. These are available in 1K (premixed) form, which is a distinct advantage. Moreover, these adhesives exhibit high flexibility. However, they suffer from low tensile strength and lack chemical resistance. They cannot be used in high traffic areas or in applications where significant water exposure is to be expected, e.g. in showers. Thus, while such adhesives have enjoyed considerable commercial success in application areas such as kitchen backsplashes, their use in other applications has been limited.

It would be desirable to provide a tile adhesive which can be used in many different application areas, which is hydrophobic, and which exhibits high values of tensile strength, adhesiveness, and flexibility, in a formulation which does not require mixing on site.

SUMMARY OF INVENTION

It has now been surprisingly and unexpectedly discovered that a tile adhesive which solves the problems identified above can be formulated by admixing at least one alkoxysilyl-terminated, urethane-linked polyoxypropylene polyether, a silicone resin, an aminoalkylalkoxysilane, a condensation catalyst, and a high proportion of mineral filler. The formulation provides high adhesive strength, high tensile and compressive strength, and low water absorption.

DETAILED DESCRIPTION OF THE PREFERRED EMBODIMENTS

The tile adhesives of the present invention contain a high amount of non-reinforcing filler, greater than 60 weight percent based on total adhesive weight. The presence of such large amounts of filler severely reduces the cost of the tile adhesive. However, most surprisingly, despite being essentially inert, the adhesive strength of the formulation increases with increasing filler content, up to about the critical pigment volume concentration, or about 85 weight percent filler. Thus, the filler should be minimally greater than 60 weight percent, more preferably, in order of increasing preference, greater than (or equal to) 65, 70, 75, 80 weight percent, and preferably less than 90 weight percent, more preferably not more than 84 to 85 weight percent.

Excellent physical properties are obtained when the concentration of filler, reinforcing filler, and any pigments present, are close to the critical pigment volume concentration ("CPVC"), preferably within the range of −5% to 2% of the CPVC.

The pigment volume concentration ("PVC") is the volume ratio of all types of fillers (non-reinforcing, reinforcing, pigment) to the volume of filler plus non-volatile binder. Thus any volatile solvents are excluded. The CPVC is calculated based on oil absorption values, e.g. the amount of linseed oil required to just wet the filler particles. The oil absorption values for each individual filler are an average for that filler taking into account variations in particle size and particle size distribution, ideal packing behavior, and assuming that the wetting of the filler by the matrix polymer and other components of the tile adhesive is similar to that of linseed oil, in accordance with the equation:

$$\text{CPVC } (\%) = 100/(1+(\rho_p + OA)/(100+\rho_L))$$

where $\rho_p$ is the density of the individual filler, OA is the oil absorption value of the individual filler, and $\mu_L$ is the density (25° C.) of linseed oil. For the tile adhesives with multiple fillers, each individual filler's CPVC is multiplied by its volume percentage in the total filler composition and these values are summed. In the tile adhesives of the invention, the CPVC is in the range of 80-90%, especially from 82-88%. In most cases, the CPVC is about 85%.

The fillers described above are rather large particle inorganic fillers such as quartz sand or ground mineral, and have a BET surface area of less than 30 m²/g. Suitable fillers are, for example, coarsely ground minerals, including limestone, marble, dolomite, quartz, basalt, and other substantially water-insoluble minerals. Very preferred fillers are those of sand, whether based on quartz minerals, i.e. silica sand, or limestone precursors such as the abraded shells of marine mollusks. The weight average particle size of the filler should be from approximately 0.1 mm to less than 1 mm. Fillers having sieve sizes of 0.02 mm to 1.0 mm (corresponding to US standard mesh 632 to 18), more preferably 0.037 mm to 0.595 mm (corresponding to US standard mesh 400 to 30), and most preferably 0.044 to 0.3 mm (corresponding to US standard mesh 325 to 50), are eminently suitable. Most preferable fillers include sand and ground limestone with these sizes. More than one type of filler may be used, and each type of filler may be used in a variety of particle sizes. The fillers are preferably thoroughly dried before admixing with the curable polymer component. Drying may be accomplished, for example, in pan driers, rotating bed dryers, fluidized bed dryers, and all other dryers suitable for removing traces of moisture from the filler. The amount of water remaining in the filler after drying should preferably be such that the completed adhesive is storage stable at 50° C. with the exclusion of moisture for at least one month, and preferably for longer periods of time such as one year or longer.

The alkoxysilyl polymer (A) is an alkoxysilyl-terminated, urea-group- or urethane-group-containing polymer component of the formula:

$$X—[(CR^1_2)_b—SiR_a(OR^2)_{3-a}]_x \qquad (I),$$

wherein

X denotes an x-valent polymer radical bonded to carbon of the $(CR^1_2)$ group, preferably via a urea or urethane group R are identical or different and are monovalent, optionally substituted, SiC-bonded hydrocarbon radicals, $R^1$ are identical or different and are hydrogen or a monovalent, optionally substituted hydrocarbon radical, which may be bonded to carbon via nitrogen, phosphorus, oxygen, sulfur, or a carbonyl group, $R^2$ are identical or different and are hydrogen or a monovalent, optionally substituted hydrocarbon radical, x is an integer from 1 to 10, preferably 1, 2, or 3, more preferably 1 or 2, most preferably 2 a may be identical or different and is 0, 1, or 2, preferably 0 or 1, and b may be identical or different and is an integer from 1 to 10, preferably 1, 3, or 4, more preferably 1 or 3, most preferably 1, and the polymer (A) contains at least one urea and/or urethane linking group.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl, and the 2-propenyl radical; aryl radicals such as the phenyl, naphthyl, anthryl, and phenanthryl radical; alkaryl radicals such as o-, m-, p-tolyl radicals; xylyl radicals and ethylphenyl radicals; and aralkyl radicals such as the benzyl radical, the α- and the β-phenylethyl radical.

Examples of substituted radicals R are haloalkyl radicals and haloaryl radicals such as the o-, m-, and p-chlorophenyl radicals. Radical R preferably comprises monovalent hydrocarbon radicals which are optionally substituted by halogen atoms and which have 1 to 6 carbon atoms, more preferably alkyl radicals having 1 or 2 carbon atoms, most preferably the methyl radical.

Examples of radicals $R^1$ are hydrogen, the radicals specified for R, and also optionally substituted hydrocarbon radicals bonded to carbon via nitrogen, phosphorus, oxygen, sulfur, carbon, or carbonyl groups. Preferably, $R^1$ is hydrogen or a hydrocarbon radical having 1 to 20 carbon atoms, most preferably hydrogen.

Examples of radical $R^2$ are hydrogen or the examples specified for radical R. Radical $R^2$ is preferably hydrogen or an alkyl radical which is optionally substituted by halogen atoms and which has 1 to 10 carbon atoms, more preferably an alkyl radical having 1 to 4 carbon atoms, most preferably the methyl and ethyl radicals.

Polymer radical X preferably comprises organic polyether polymer radicals which as a polymer chain, comprise polyoxyalkylenes such as polyoxyethylene, polyoxypropylene, polyoxybutylene, polyoxytetramethylene, polyoxyethylene-polyoxypropylene copolymer, and polyoxypropylene-polyoxybutylene copolymer. Less preferably, hydrocarbon polymers such as polyisobutylene, polyethylene, or polypropylene, and copolymers of polyisobutylene with isoprene; polyisoprenes; polyurethanes; polyesters, polyamides; polyacrylates; polymethacrylates; and polycarbonates, may be used. The polymer radical X is bonded preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, and —NR'— to the group or groups —[(CR¹₂)_b—SiR_a(OR²)_{3-a}], where R' may be identical or different and has a definition specified for R, or is a group —CH(COOR")—CH₂—COOR", in which R" may be identical or different and has a definition specified for R.

Examples of radicals R' are cyclohexyl, cyclopentyl, n-propyl and isopropyl, n-butyl, isobutyl, and tert-butyl radicals, the various stereoisomers of the pentyl radical, hexyl radical, or heptyl radical, and also the phenyl radical. Radical $R^1$ is preferably a group —CH(COOR")—CH₂—COOR" or an optionally substituted hydrocarbon radical having 1 to 20 carbon atoms, more preferably a linear, branched or cyclic alkyl group having 1 to 20 carbon atoms, or an aryl group which has 6 to 20 carbon atoms and is optionally substituted by halogen atoms. The radicals R" are preferably alkyl groups having 1 to 10 carbon atoms, more preferably methyl, ethyl, or propyl radicals.

More preferably, radical X in formula (I) comprises polyurethane radicals and polyoxyalkylene radicals, most preferably polyoxypropylene-containing polyurethane radicals or polyoxypropylene radicals. The polymer radical X must be such that sufficient adhesion, tensile strength, and hydrophobicity may be obtained. Polyoxypropylene polyethers and polyurethanes prepared by reacting a polyoxypropylene polymer with a diisocyanate are preferred. Branched polyoxypropylene polyethers are also preferred.

The alkoxysilyl polymer component (A) may have the groups —[(CR$^1$$_2$)$_b$—SiR$_a$(OR$^2$)$_{3-a}$] attached at any desired locations within the polymer such as within the chain and/or terminally, preferably within the chain and terminally, more preferably only terminally.

Where X are urethane or urea group-containing radicals, the radicals in question are preferably those whose chain ends are bonded via —NH—C(=O)O—, —NH—C(=O)—NH—, —NR'—C(=O)—NH—, or —NH—C(=O)—NR'—, more preferably via —O—C(=O)—NH— or —NH—C(=O)—NR'—, to the group or groups —[(CR$^1$$_2$)$_b$—SiR$_a$(OR$^2$)$_{3-a}$], with all of the radicals and indices having one of the definitions given above.

The polyurethane radicals X are preferably prepared from linear or branched polyoxyalkylenes, more preferably from polypropylene glycols, by reaction with di- or polyisocyanates. These radicals X preferably have number-average molar masses $M_n$ of 10,000 to 30,000 g/mol, more preferably 11,000 to 20,000 g/mol. Suitable processes for preparing the alkoxysilyl polymer component, are described in publications including EP 1 093 482 B1 (paragraphs [0014]—[0023], [0039]—[0055] and also inventive example 1 and comparative example 1) and its U.S. equivalent U.S. Pat. No. 6,884,852, and EP 1 641 854 B1 (paragraphs [0014]—[0035], inventive examples 4 and 6, and comparative examples 1 and 2), and its U.S. equivalent U.S. Patent Application 2007/167598, the disclosures of which are incorporated in their entirety by reference herein.

Where X includes polyoxyalkylene radicals, the radicals in question are preferably linear or branched polyoxyalkylene radicals, more preferably polyoxypropylene radicals, whose chain ends are bonded preferably via —O—C(=O)—NH— to the group or groups —[(CR$^1$$_2$)$_b$—SiR$_a$(OR$^2$)$_{3-a}$]. The polyoxyalkylene radicals X preferably have number-average molar masses $M_n$ of 10,000 to 30,000 g/mol, more preferably of 11,000 to 20,000 g/mol. Suitable processes for preparing the alkoxysilyl polymer component (A), are described in publications including EP 1 535 940 B1 and its U.S. equivalent U.S. Patent Application 2005/119436 (A1) (paragraphs [0005]—[0025] and also inventive examples 1-3 and comparative examples 1-4) and EP 1 896 523 B1 (paragraphs [0008]—[0047]), and its U.S. equivalent U.S. Patent Application 2010/016537 (A1), the disclosures of which are incorporated in their entirety by reference herein.

The number-average molar mass $M_n$ can be determined by means of Size Exclusion Chromatography (SEC) against a polystyrene standard, in THF, at 60° C., a 1.2 ml/min flow rate, and detection by RI (refractive index detector) on a Styragel HR3-HR4-HR5-HR5 column set from Waters Corp. USA, with an injection volume of 100 µl. Other methods which provide comparable accuracy are also useful.

The end groups of the alkoxysilyl polymer component (A) are preferably groups of the general formulae:

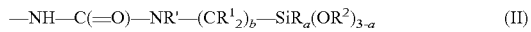
—NH—C(=O)—NR'—(CR$^1$$_2$)$_b$—SiR$_a$(OR$^2$)$_{3-a}$   (II)

and

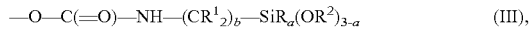
—O—C(=O)—NH—(CR$^1$$_2$)$_b$—SiR$_a$(OR$^2$)$_{3-a}$   (III), where the radicals and indices have one of the definitions specified above.

The end groups of the compounds of the alkoxysilyl polymer component (A) are more preferably groups of the formula (II). The compounds of the alkoxysilyl polymer component are preferably silane-terminated polyoxyalkylenes, more preferably silane-terminated polyoxypropylenes, having end groups of the formula (III), where R$^1$ is hydrogen atom, R is methyl radical, R$^2$ is methyl or ethyl radical, b is 1 or 3, and a is 0 or 1. Apart from the end groups (III), these silane-terminated polyoxyalkylenes preferably have exclusively polyether units. The compounds of the alkoxysilyl polymer component preferably possess 2 or 3, more preferably 2, end groups of the formula (III) per molecule.

A great advantage of silane-terminated polyoxyalkylenes having end groups of the formula (III) relative to silane-terminated polyoxyalkylenes with other end groups is their ease of preparability by reaction of common polyoxyalkylenes, terminated with hydroxyl groups, and silanes of the formula:

OCN—(CR$^1$$_2$)$_b$—SiR$_a$(OR$^2$)$_{3-a}$   (IV), wherein all the radicals and indices have one of the definitions stated above. It is preferable that this reaction achieves largely complete termination of the chain ends present, thereby distinguishing the products resulting from this method significantly from the products of other methods, such as a hydrosilylation of α,ω-unsaturated polymers with SiH-functional silanes, for example. The largely complete termination contributes to better tensile strength and other properties of the alkoxysilyl polymer component, in comparison to polymers whose end groups have been produced by another route, such as via hydrosilylation, for example.

The compounds of the alkoxysilyl polymer component (A) are preferably polymers whose chain ends are terminated to an extent of at least 85%, more preferably at least 90%, most preferably at least 95%, with end groups of the formula (III). Especially preferred as alkoxysilyl polymer component are those based on linear polyoxypropylenes whose chains are terminated to an extent of at least 85%, more preferably at least 90%, more preferably at least 95%, with end groups of the formula (II).

The number-average molecular weights $M_n$ of the compounds of the alkoxysilyl polymer component (A) are preferably at least 10,000 g/mol, more preferably at least 11,000 g/mol, and preferably not more than 30,000 g/mol, more preferably not more than 24,000 g/mol, most preferably not more than 22,000 g/mol.

The viscosity of the compounds of the alkoxysilyl polymer component is preferably at least 0.2 Pas, more preferably at least 1 Pas, most preferably at least 5 Pas, and preferably not more than 700 Pas, more preferably not more than 100 Pas, in each case measured at 20° C.

The compounds of the alkoxysilyl polymer component (A) may comprise only one kind of compound of the formula (I) or mixtures of different kinds of compounds of the formula (I). The compounds of the alkoxysilyl polymer component may contain exclusively compounds of the formula (I) in which more than 90%, preferably more than 95%, more preferably more than 98% of all silyl groups bonded to the radical X are identical. It is also possible to use compounds of the alkoxysilyl polymer component (A) which consist at least partly of compounds of the formula (I) in which different silyl groups are bonded to a radical X. Mixtures of different compounds of the formula (I) may be used as compounds of the alkoxysilyl polymer component in which in total at least two different kinds of silyl groups bonded to radicals X are present, but where all silyl groups each bonded to one radical X are identical.

If the compounds of the alkoxysilyl polymer component (A) comprise different kinds of compounds of the formula (I), preference is given to mixtures which comprise compounds (A1) having end groups of the formula (II) or (III) in which b=1, $R^1$=H, and a=0 or 1, and also compounds (A2) having end groups of the formula (II) or (III) in which b=3, $R^1$=H, and a=0, and particular preference to those in which the weight ratio of (A1) to (A2) is 0.1 to 10, preferably 0.2 to 5.

In order to provide sufficient hydrophobicity of the alkoxysilyl-terminated polymer, when polyoxyalkylene groups are present, it is preferably that these contain only a small proportion of oxyethylene groups relative to total oxyalkylene groups. Thus, the polyether backbone of the polymer is preferably a polyether prepared from "hydrophobic" oxyalkylene groups, derived from polymerizing alkylene oxides such as propylene oxide, 1,2-butylene oxide, 2,3-butylene oxide, and tetrahydrofuran. In addition, long chain alkylene oxides such as those available under the tradename VIKOLOX® may be used, especially in minor proportions relative to total alkylene oxide. Most preferably for reasons of low cost coupled with good performance, propylene oxide is used, and thus the preferred polymers are alkoxysilylalkylcarbamate-terminated polyoxypropylene diols. The polymer backbone may also advantageously consist of polyoxyalkylene segments, preferably polyoxypropylene segments, bonded to each other by urethane linkages. Such polymers can be simply and effectively prepared by reaction of a stoichiometric excess of either a polyoxypropylene diol or a diisocyanate, producing hydroxy-capped polyurethane polymers in the first case, and isocyanate-capped polyurethane polymers in the second case. Either of these can be reacted with a complementarily reactive alkoxysilane to produce the silyl-terminated polymers of the invention.

The inventive tile adhesives contain a silicone resin (B). The silicone resins (B) comprise units of the formula

$$R^3{}_c(R^4O)_d SiO_{(4-c-d)/2} \qquad (V),$$

where $R^3$ may be identical or different and denotes hydrogen or a monovalent, SiC-bonded, optionally substituted hydrocarbon radical, $R^4$ may be identical or different and denotes hydrogen or a monovalent, optionally substituted hydrocarbon radical, c is 0, 1, 2, or 3, and d is 0, 1, 2, or 3, preferably 0, 1, or 2, more preferably 0 or 1, where the sum of c+d is less than or equal to 3 and in at least 50%, preferably at least 60%, of the units of the formula (V) c is equal to 0 or 1.

Based on 100 parts by weight of compounds (A) the compositions of the invention contain in total preferably 30 to 1000 parts by weight, more preferably 60 to 500 parts by weight, more preferably 80 to 300 parts by weight of silicone resins (B).

The silicone resins (B) preferably contain at least 90 wt. % of units of the formula (V). With particular preference, silicone resins (B) consist exclusively of units of the formula (V).

Examples of radicals $R^3$ are the examples specified above for R.

Radical $R^3$ preferably comprises monovalent, SiC-bonded aliphatic or aromatic hydrocarbon radicals which are optionally substituted by halogen atoms and which have 1 to 18 carbon atoms, more preferably the methyl or phenyl radical. In particular, all radicals $R^3$ are exclusively methyl and phenyl radicals.

Examples of radical $R^4$ are hydrogen or the examples specified for radical R. Radical $R^4$ preferably comprises hydrogen or alkyl radicals having 1 to 10 carbon atoms that are optionally substituted by halogen atoms, more preferably hydrogen or alkyl radicals having 1 to 4 carbon atoms, more particularly the methyl, ethyl, or butyl radical, most preferably the methyl radical.

Phenylsilicone resins are used with preference as compound (B). With particular preference the phenylsilicone resins (B) consist exclusively of units of the formula (V) in which at least 10%, preferably at least 50%, and more preferably at least 60% of all units of the formula (V) have at least one SiC-bonded phenyl group.

Employed with preference are silicone resins (B) in which c+d is less than 3.

In one embodiment of the invention, phenylsilicone resins (B) are used which contain, based in each case on the total number of units of the formula (II), at least 50%, more preferably at least 60%, of units of the formula (V) in which c is 1.

In one preferred embodiment of the invention, silicone resins (B) are used which have exclusively units of the formula (V) in which c is 0, 1 or 2, with the proviso that c is equal to 0 or 1 in at least 50% of the units of the formula (II).

In one preferred embodiment of the invention, silicone resins (B) are used which have exclusively units of the formula (V) in which c is 1 or 2.

In one specific embodiment of the invention, silicone resins (B) are used which have exclusively units of the formula (V) in which c is 1.

Preference is given to using silicone resins (B) which have, based in each case on the total number of units of the formula (V), at least 70%, more preferably at least 80%, of units of the formula (II) in which d is 0 or 1.

Preference is given to using silicone resins (B) which, based in each case on the total number of units of the formula (II), have 30% to 95%, more preferably 30% to 90%, of units of the formula (II) in which d is 0.

Examples of silicone resins (B) are organopolysiloxane resins which consist substantially, preferably exclusively, of (Q) units of the formulae $SiO_{4/2}$, $Si(OR^4)O_{3/2}$, $Si(OR^4)_2O_{2/2}$ and $Si(OR^4)_3O_{1/2}$, (T) units of the formulae $PhSiO_{3/2}$, $PhSi(OR^4)_2O_{2/2}$ and $PhSi(OR^4)_2O_{1/2}$, (D) units of the formulae $Me_2SiO_{2/2}$ and $Me_2Si(OR^4)O_{1/2}$, and also (M) units of the formula $Me_3SiO_{1/2}$, where Me is a methyl radical, Ph is a phenyl radical, and $R^4$ is a methyl, ethyl or butyl radical, preferably a methyl radical, with the resin containing preferably 0-2 mol of (Q) units, 0-2 mol of (D) units, and 0-2 mol of (M) units per mol of (T) units.

Preferred examples of silicone resins (B) are organopolysiloxane resins which consist substantially, preferably exclusively, of T units of the formulae $PhSiO_{3/2}$, $PhSi(OR^4)_2O_{2/2}$ and $PhSi(OR^4)_2O_{1/2}$ and T units of the formulae $MeSiO_{3/2}$, $MeSi(OR^4)O_{1/2}$ and $MeSi(OR^4)_2O_{1/2}$, and also, optionally, D units of the formulae $Me_2SiO_{2/2}$ and $Me_2Si(OR^4)O_{1/2}$, where Me is a methyl radical, Ph is a phenyl radical, and $R^4$ is a methyl, ethyl or butyl radical, preferably a methyl radical. The molar ratio of phenylsilicone to methylsilicone units is preferably between 0.5 and 2.0. The amount of D units in these silicone resins is preferably below 10 wt %.

Additionally preferred examples of silicone resins (B) are organopolysiloxane resins which consist substantially, preferably exclusively, of T units of the formulae $PhSiO_{3/2}$, $PhSi(OR^4)_2O_{2/2}$ and $PhSi(OR^4)_2O_{1/2}$ where Ph is phenyl radical and $R^4$ is a methyl, ethyl or butyl radical, preferably a methyl radical.

The silicone resins (B) preferably possess a number-average molar mass $M_n$ of at least 400 g/mol and more preferably of at least 600 g/mol. The average molar mass $M_n$ is preferably not more than 400,000 g/mol, more preferably not more than 100,000 g/mol, and most preferably not more than 50,000 g/mol. They may be either solid or liquid at 23° C. and 1000 hPa, with liquid silicone resins being preferred.

The compounds (B) used in accordance with the invention may be prepared by methods which are commonplace within chemistry, and/or are commercial products, such as the products SILRES® IC 368, SILRES® IC 678, or SILRES® SY231, for example, available commercially from Wacker Chemie AG, Munich (DE).

An aminoalkyl-functional di- or trialkoxysilane (C) is a necessary component and serves as an adhesion promoter and cocatalyst. The aminoalkylalkoxysi lanes have the formula

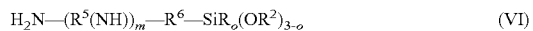

$$H_2N-(R^5(NH))_m-R^6-SiR_o(OR^2)_{3-o} \qquad (VI)$$

where R is as defined previously, $R^2$ is as defined previously, $R^5$ and $R^6$ are each a divalent alkylene radical having from 1 to 6 carbon atoms, preferably 2 or 3 carbon atoms, m is 0, 1, or 2, and o is 0 or 1, preferably 0, or a partial hydrolysate thereof. Preferred aminoalkylalkoxysilanes include aminopropyltrimethoxysilane, aminopropylmethyldimethoxysilane, N-(2-aminoethyl)-3-aminopropyltrimethoxysilane, and N-(3-aminopropyl)-2-aminoethyltrimethoxysilane, as well as the corresponding ethoxy analogs. Other aminoalkyl-functional di- or trialkoxysilanes with alkoxy groups other than methoxy or ethoxy are also useful, but less preferred due both to higher cost and reduced reactivity. The aminoalkylalkoxysilane (C) is preferably present in amounts of 2 to 10 weight percent, more preferably 3 to 7 weight percent, and most preferably 4 to 6 weight percent, based on the weight of the polymer component (A) and silicon resin (B).

A catalyst (D) which catalyzes the hydrolysis and condensation of silicon-bonded alkoxy groups may also be necessary in some cases. Such catalysts are well known, and include compounds of tin bismuth, zinc, iron, barium, zirconium and lead, preferably as metal carboxylate salts, and metal octanoates of iron and lead as a tin-free system. Additional suitable catalysts may be catalysts containing a basic nitrogen or phosphorus compound, a phosphorus acid, or carboxylic acid, dibutyl- or dioctyltin compounds. Compounds of the metals lithium, sodium, potassium, magnesium, calcium, or strontium, especially carboxylates of these metals, are also very suitable because they permit rapid crosslinking and their use does not lead to health hazards. By suitable selection of the alkoxysilyl terminated polymer, it is possible to produce systems with rapid curing times free of catalysts. Such systems advantageously contain alkoxysilyl group-containing polymers (A) of the formula (I) where b is 1.

The catalyst (D), when necessary, should be present in an effective catalytic amount, preferably from 0.01 to 2 weight percent, more preferably 0.05 to 1 weight percent, and most preferably 0.05 to 0.2 weight percent, based on the weight of the polymer component.

In addition to these necessary components, additional optional components (L) may be added as well. Among these optional additives are water scavengers, adhesion promoters, crosslinkers, antioxidants, UV-stabilizers, emulsifiers, and biocides. If the compositions (K) of the invention do comprise additives (L), the amounts involved are preferably 0.01 to 30 parts by weight, more preferably 0.1 to 10 parts by weight, based in each case on 100 parts by weight of constituent (A). The compositions (K) of the invention do preferably comprise additives (L).

Water scavengers are well known in the art, and are generally reactive alkoxysilanes such as methylcarbamatomethyltrimethoxysilane, methyltrimethoxysilane, tetramethoxysilane, vinyltrimethoxysilane, and the like. The optional water scavenger is preferably present in amounts of 2 to 15 weight percent, more preferably 3 to 12 weight percent, based on the weight of the components (A) and (B). Adhesion promoters are also well known, and include functional alkoxysilanes such as aminopropyltrimethoxysilane, N-(2-aminoethyl)-3-aminopropyltrimethoxysilane, and epoxy-functional alkoxysilanes such as 3-glycidylpropyltrimethoxysilane, and their ethoxy analogs. Di-, tri- and tetraalkoxysilanes, including functionalized trialkoxysilanes can be used as crosslinkers. Thus, some of these compounds can perform more than one function.

In general, light stabilizers are not necessary for the tile adhesives, since they are not expected to be exposed to any high degree of light after application. However, such stabilizers may be added. Antioxidants, on the other hand, are preferred ingredients, since these may deter deterioration of the polymer matrix over time. All antioxidants previously used in organosilicon polymers can be used, as well as antioxidants which serve a similar function for other polymers such as polyolefins, polyvinylacetates, polyvinyl chloride, and polyurethanes, as non-limiting examples.

Preferred antioxidants are hindered phenol type antioxidants and hindered amine stabilizers ("HAS"). Hindered phenol antioxidants include phenols containing but one aromatic ring, such as substituted catechols, hydroquinones, and phenols, and low molecular weight, oligomeric and polymeric antioxidants containing more than one of such species. Preferred examples include butylated hydroxytoluene ("BHT") and other alkylated phenols. Numerous such antioxidants are commercially available, from numerous sources, such as BASF AG, Ludwigshaven, Germany.

HAS stabilizers are also well known and may, for example, be alkylated aryl amines, particularly polyaryl amines. Hindered amine light stabilizers, ("HALS") may also be useful in the role of an antioxidant, in particular in combination with hindered phenol antioxidants. Like the hindered phenol antioxidants, such HAS and HALS stabilizers are well known, and available from numerous sources, for example from BASF AG. Other antioxidants, such as the phosphite antioxidants, metal thiolates, and others may be found, in addition to hindered phenols, HAS, and HALS, in S. Al-Malaika, Antioxidants: An Overview, Volume 1 of the series POLYMERIC SCIENCE AND TECHNOLOGY, Springer Netherlands, © 1998, and other patents, publications, and treatises.

When employed, the amount of antioxidants is preferably from about 0.1 to 5 weight percent based on the total weight of the matrix polymer, e.g. the total of the weights of components (A), (B), AND (C) more preferably 0.2 to 1 weight percent, and most preferably about 0.5 weight percent. TINUVIN® B 75 is a preferred antioxidant. TINUVIN® B 75 is a commercially available mixture (BASF) of 20% Irganox® 1135 (CAS. 125643-61-0), 40% Tinuvin® 571 (CAS. 23328-53-2) und 40% Tinuvin® 765 (CAS. 41556-26-7).

The tile adhesives are supplied as one-component systems in moisture-free containers. However, for convenience of discussion relative to the formulation, the components can be treated separately as a polymer component and a filler component. It is emphasized that these are not supplied as separate components, but rather as a one component (1K) mixture.

In addition, the polymer component may contain further optional additives, such as plasticizers, preferably in an amount of up to 20 weight percent, more preferably 0 to 10 weight percent, and most preferably 2 to 5 weight percent. The plasticizers, when used, may be reactive plasticizers bearing an alkoxysilyl or other reactive group. A preferred plasticizer is a polyoxypropylene glycol.

The filler component contains non-reinforcing mineral fillers in an amount of 70-100 weight percent, but may also include reinforcing fillers, defined herein as fillers having a BET surface area >30 $m^2$/g, preferably colloidal or pyrogenic silica or titania, preferably silica, and preferably having a BET surface area of >50 $m^2$/g, more preferably 100 $m^2$/g to 300 $m^2$/g. The fine silica particles are preferably hydrophobicized. A suitable silica is HDK® H18 hydrophobic silica having a BET surface area of 170-230 $m^2$/g and about 25 mol percent of residual silanol groups. Reinforcing fillers in the filler component may be added to alter flow properties such as viscosity, slump, or thixotropy, or may be added to increase the physical properties of the cured silicone components, which non-reinforcing fillers cannot ordinarily do.

The filler component may also include non-mineral fillers such as polymer beads, short length polymer fibers, or polymer microballoons. Such products are well known for use in other compositions, and are widely available.

The filler component may also contain glass microballoons. These are advantageously added to reduce the density of the adhesive. Short inorganic fibers such as basaltic or glass fibers may also be included. For short polymer fibers or short inorganic fibers, the fiber length is preferably from about 0.1 mm to 5 mm, more preferably 0.2 mm to 2 mm. The fibers may be useful in increasing tensile and flexural strength, but should not be present in lengths which impair spreadability of the tile adhesive.

While not preferred, the filler component may also contain pigmentation, which may be organic or inorganic. However, since the tile adhesive will be hidden beneath the applied tile, no pigments are ordinarily required, and thus the presence of pigments is not preferred.

The "organic," active components of the composition contain at least components (A), (B), and (C), and optimally (D). The compositions contain a major amount of at least one filler.

The polymer component, including alkoxysilyl-terminated organopolysiloxanes (A), silicone resin (B), aminoalkylalkoxysilane (C), optional catalyst (D), and any other organo silicon components, is present in amounts of from about 10 weight percent to about 40 weight percent based on the total weight of the polymer component and the filler component, and the filler component is present in an amount of from 90 weight percent to 60 weight percent on the same basis. In addition to these necessary components, the adhesives may contain further additives in an amount of up to 20 weight percent of the final tile adhesive formulation, more preferably up to 10 weight percent, and most preferably up to 5 weight percent. These include reactive diluents; organic solvents (not preferred); viscosity adjusting agents; biocides such as algaecides, mildewcides, and fungicides; other, non-alkoxysilylated polymers such as butadiene/styrene, vinyl acetate/ethylene, and other addition polymers, in addition to the optional components previously mentioned.

In the inventive formulations, the necessary components are the alkoxysilyl-functional polymers (A), silicone resin (B), the aminoalkylalkoxysilane (C), and the non-reinforcing inorganic filler. Optional components may be included, but also may be excluded. The presence of a catalyst (D) is preferred, as is also the presence of at least one antioxidant. In each case, a single type of a particular component may be used, or a plurality of such components may be used.

Test Methods

Since there is no industry standard to assess ultimate tensile strength, this parameter was measured as follows. The tile adhesive was cast into the shape of a standard "rubber dog bone" as described in ASTM D 412 for use in tension testing of rubber materials, with dimensions of 4.5 inch (114.3 mm), with a central portion of 1.5 inch (38.1 mm) length being ¼ inch (6.35 mm) wide, the ends terminated by enlarged tabs 1 inch (25.4 mm) by 1 inch (25.4 mm), with a smooth transition onto both sides of the central portion. The dog bone specimen had a nominal thickness of 0.1 inch (2.54 mm), and the actual thickness was measured. The samples were dried in the case for three days, removed, and placed face down to dry for an additional four days. Compressed air actuated alligator clips with 2 inch (50.8 mm) jaws were used to hold the samples. The samples were preloaded with 0.2 pounds force (0.89 N) and pulled at a rate of 2.5 inch/min (63.5 mm/min) until break. Ultimate tensile pound=16 strength was calculated from the data by standard methods of tensile strength testing, and reported lb/$in^2$ (MPa).

Flexural strength was measured by casting rectangular "pencils" having dimensions of 10 mm by 4 mm by 80 mm in a Teflon® polymer mold. The cured samples were allowed to dry for two days in mold, then removed and allowed to dry for an additional 12 hours prior to testing. Flexural strength was evaluated using a standard three point bend apparatus in compression mode, with force applied from the top. The gauge length for testing was 60 mm under a constant load rate of 0.125 lbs/min (0.556 N/min). Results are reported in lb/$in^2$ (MPa).

Lap shear adhesion is measured by applying adhesive on both of two marble tiles measuring 2 in. (50.8 mm) by 5 in. (127 mm) by 0.5 in. (12.7 mm) and overlapping and bonding the tiles together with an adhesive thickness of 0.125 in (3.18 mm) and an overlap of 1 inch (25.4 mm) by employing two 0.125 in. (3.18 mm) spacers, which are later removed. The tiles were set in a tray having a riser such that the upper tile is supported without inducing strain on the adhered joint. The samples were allowed to dry for 7 days, following which they were clamped in alligator jaws on a standard test instrument, preloaded to 0.2 lbs force (0.89 N) and pulled apart at a rate of 0.05 in/min (1.27 mm/min) until failure. Results are presented in lb/$in^2$ (MPa).

Tensile adhesion (Table 2) was measured by adhering a 2 in. by 2 in. (50.8 mm×50.8 mm) square tile onto a bed of adhesive, adhesively bonding a stud to the top of the tile, and applying increasing tension until failure. The result is reported in N/$mm^2$.

EXAMPLES

Tile adhesives were prepared. The tile adhesives contained about 80.9 weight percent of sand as a filler, and about 16 weight percent of silicone polymer blend, containing alkoxysilyl-terminated polymer (Geniosil® STP-E35, Wacker Chemie AG), and phenylmethyl silicone resin. Each formulation also contained 2.0 wt. % of Geniosil® XL-10 (vinyltrimethoxysilane) as a water scavenger, 1.0 wt. % of Geniosil® GF-9 (N-(2-aminoethyl)-3-aminopropyltrimethoxysilane), and 0.1 wt. % of DBTDL (dibutyl tin dilaurate) as a condensation crosslinking catalyst. the filler component, in an amount of 80.9 wt. %, contained 6.2 wt. % F-75 sand, 12.4 wt. % F-60 sand, and 81.4 wt. % F-50 sand. Contents of alkoxysilyl-functional polymer and silicone resin are set forth in Table 1, along with measured properties. Elongation was measured in accordance with ANSI A 136.1. Examples C1-C3 are Comparative Examples.

TABLE 1

| Example | Silicone Resin | Polymer | Compressive Strength lbs/in² (MPa) | Ultimate Tensile Strength lbs/in² (MPa) | Flexural Strength lbs/in² (MPa) | Adhesive Lap Shear Strength lbs/in² (MPa) |
|---------|---------------|---------|-----------------------------------|----------------------------------------|--------------------------------|------------------------------------------|
| 1  | 10.40 | 5.60  | 2200 (15.2) | 3350 (23.1) | 580 (4.0) | 100 (0.69) |
| 2  | 8.65  | 7.36  | 2300 (15.9) | 3250 (22.4) | 590 (4.1) | 120 (0.83) |
| 3  | 7.8   | 8.20  | 2200 (15.2) | 2800 (19.3) | 590 (4.1) | 130 (0.90) |
| 4  | 6.96  | 9.04  | 2000 (13.8) | 2500 (17.2) | 500 (3.4) | 140 (0.97) |
| 5  | 4.49  | 11.51 | 1450 (10.0) | 1800 (12.4) | 400 (2.8) | 150 (1.03) |
| C1 | 1.89  | 14.11 | 700 (4.8)   | 850 (5.9)   | 250 (1.7) | 90 (0.62)  |
| C2 | 1.37  | 14.63 | 500 (3.4)   | 800 (5.5)   | 200 (1.4) | 70 (0.48)  |
| C3 | 0     | 16.00 | 450 (3.1)   | 780 (5.4)   | 200 (1.4) | 60 (0.41)  |

Table 1 shows that the inventive compositions have adequate flexural strength and very high values of ultimate tensile strength and compressive strength. As the weight percentage of the high molecular weight alkoxysilyl-terminated polymer increases, based on the total weight of alkoxysilyl-terminated polymers, the ultimate tensile strength declines somewhat, but is still highly satisfactory up to a concentration of about 60 wt. % of the high molecular weight component (based on the total weight of silicone resin plus alkoxysilyl-terminated polymer (A)). The compressive strength initially rises and then becomes relatively constant, falling modestly, but to a still acceptable level, at about 40 parts resin per 100 parts polymer. Compressive strength falls rapidly below 30 parts by weight of silicone resin. Flexural strength remains substantially constant. Meanwhile, the adhesive strength increases.

Other formulations were prepared and tested against conventional inorganic binder tile adhesives and a commercial RTU tile adhesive for adhesive strength measured in accordance with ISO 13007-2-4.4. The results are presented below in Table 2.

TABLE 2

| Tile Adhesive | Tensile Adhesion Range (N/mm²) |
|---------------|-------------------------------|
| Inventive     | 1.5-≥2.75¹                    |
| RTU           | 0.25-1.0                      |
| Cementitious  | 0.75-1.5                      |

¹Maximum instrument capability is 2.75 N/mm²

As illustrated by Table 2, the inventive formulations exhibit tensile adhesion which generally exceeds even the best cementitious tile adhesives tested, and in most cases is far superior. Some formulations exceeded the test capacity of the measuring instrument. The adhesion of the inventive compositions was in all cases highly superior to the adhesion exhibited by RTU tile adhesives. All inventive formulations exhibited water absorption values which were far less than those exhibited by RTU and cementitious tile adhesives.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. In a process for adhesively bonding inorganic facing materials to a substrate with a tile adhesive, the improvement comprising employing an RTV single component (RTV-1) tile adhesive composition, wherein the tile adhesive composition is prepared by admixing:
   a) from 5 to 40 weight percent of a moisture-curable alkoxysilyl-functional polymer component based on the total weight of the tile adhesive; and
   b) a filler component comprising sand having a BET surface area of less than 30 m²/g, wherein the amount of the filler component is such that the sand is present in an amount of at least 60 wt. % based on the total weight of the tile adhesive;

wherein the polymer component comprises:
   A) 100 parts of at least one liquid alkoxysilyl-functional polymer having a viscosity of less than 700 Pas measured at 25° C., and corresponding to the formula (I)

$$X-[(CR^1{}_2)_b-SiR_a(OR^2)_{3-a}]_x \qquad (I),$$

wherein
   X denotes an x-valent polymer radical bonded to carbon of the $(CR^1{}_2)_b$ group via a urea or urethane group
   R are identical or different and are monovalent, optionally substituted, SiC-bonded hydrocarbon radicals,
   $R^1$ are identical or different and are hydrogen or a monovalent, optionally substituted hydrocarbon radical, which may be bonded to carbon via nitrogen, phosphorus, oxygen, sulfur, or carbonyl group,
   $R^2$ are identical or different and are hydrogen or a monovalent, optionally substituted hydrocarbon radical,
   x is an integer from 1 to 10,
   a each is identical or different and is 0, 1, or 2,
   b each is identical or different and is an integer from 1 to 10,
   B) from 40 to 1000 parts relative to 100 parts A, of at least one silicone resin comprising units of the formula (V)

$$R^3{}_c(R^4O)_d SiO_{(4-c-d)/2} \qquad (V),$$

where
   $R^3$ are identical or different and denotes hydrogen or a monovalent, SiC-bonded, optionally substituted hydrocarbon radical,
   $R^4$ are identical or different and denotes hydrogen or a monovalent, optionally substituted hydrocarbon radical,
   c is 0, 1, 2, or 3, and
   d is 0, 1, 2, or 3, where the sum of c+d is less than or equal to 3 and in at least 50% of the units of the formula (V) c is equal to 0 or 1, C) at least 0.5 parts per 100 parts (A) of at least one aminoalkylalkoxysilane or partial hydrolysate thereof D) optionally, one of more condensation catalysts;

E) optionally, one or more water scavengers;

F) optionally, one or more adhesion promoters different from the aminoalkylalkoxysilane or partial hydrolysate thereof, and different from components C) and E);

G) optionally one or more plasticizers;

H) optionally, one or more alkoxysilyl-functional cross-linkers different from components E) and F) and having a molecular weight below 500 Da, and/or a partial hydrolysate thereof;

I) optionally, one or more antioxidants and/or UV-stabilizers;

J) optionally, one or more biocides.

2. The process of claim 1, wherein d is 0 or 1.

3. The process of claim 1, wherein X comprises polyoxyalkylenes, hydrocarbon polymers, polyurethanes, polyesters, polyamides, polyacrylates, polymethacrylates, or polycarbonates.

4. The process of claim 1, wherein X comprises a polyoxyalkylene polyether.

5. The process of claim 1, wherein the polymer component a) contains up to 60 weight percent of at least one alkoxysilyl-functional polymer (A) of formula (I) which has a viscosity at 25° C. of greater than 0.2 Pa·s, the weight percentage of (A) based on the total weight of the polymer component.

6. The process of claim 1, wherein the viscosity of the alkoxysilyl-functional polymer (A) is greater than 5 Pa·s at 25° C.

7. The process of claim 1, wherein the polymer radical X comprises a hydrophobic polyoxyalkylene polyether.

8. The process of claim 1, wherein the aminoalkyl-functional silane (C) or partial hydrolysate thereof is present in an amount of 2 to 10 wt. % based on the weight of (A) and (B).

9. The process of claim 1, wherein sand is present in an amount of from 75 weight percent to 90 weight percent based on the total weight of the tile adhesive.

10. The process of claim 1, wherein the filler is present in an amount which is within −5% to +2% of the critical pigment volume concentration of the tile adhesive.

11. The process of claim 1, wherein polymer component a) comprises at least one of a catalyst (D), a water scavenger (E), and an adhesion promoter (F).

12. The process of claim 1, wherein the polymer component a) comprises (A), (B), (C), and (D), optionally one or more of (E), (F), (G), and (H), and optionally one or more antioxidants.

13. The process of claim 1, wherein the filler component b) is present in an amount of from 80 to 90 weight percent based on the total weight of the tile adhesive.

14. The process of claim 1, wherein the polymer component b) comprises from 60 to 500 parts by weight of silicone resin (B) per 100 parts of alkoxysilyl-functional polymer (A).

15. The process of claim 1, wherein in all alkoxysilyl-functional polymers of formula (I), b is 3, and a condensation-promoting curing catalyst is present.

16. In a process for adhesively bonding inorganic facing materials to a substrate with a tile adhesive, the improvement comprising employing an RTV single component (RTV-1) tile adhesive composition, wherein the tile adhesive composition is prepared by admixing:

a) from 5 to 40 weight percent of a moisture-curable alkoxysilyl-functional polymer component based on the total weight of the tile adhesive; and b) a filler component comprising sand, wherein the amount of the filler component is such that sand is present in an amount of at least 60 wt. % based on the total weight of the tile adhesive;

wherein the polymer component comprises:

A) 100 parts of at least one liquid alkoxysilyl-functional polymer having a viscosity of less than 700 Pa·s measured at 25° C., and corresponding to the formula (I)

$$X-[(CR^1{}_2)_b-SiR_a(OR^2)_{3-a}]_x \quad (I),$$

wherein

X denotes an x-valent polymer radical bonded to carbon of the $(CR^1{}_2)_b$ group via a urea or urethane group R are identical or different and are monovalent, optionally substituted, SiC-bonded hydrocarbon radicals, $R^1$ are identical or different and are hydrogen or a monovalent, optionally substituted hydrocarbon radical, which may be bonded to carbon via nitrogen, phosphorus, oxygen, sulfur, or carbonyl group, $R^2$ are identical or different and are hydrogen or a monovalent, optionally substituted hydrocarbon radical, x is an integer from 1 to 10, a each is identical or different and is 0, 1, or 2, b each is identical or different and is an integer from 1 to 10, B) from 40 to 1000 parts relative to 100 parts A, of at least one silicone resin comprising units of the formula (V)

$$R^3{}_c(R^4O)_d SiO_{(4-c-d)/2} \quad (V),$$

where $R^3$ are identical or different and denotes hydrogen or a monovalent, SiC-bonded, optionally substituted hydrocarbon radical, $R^4$ are identical or different and denotes hydrogen or a monovalent, optionally substituted hydrocarbon radical, c is 0, 1, 2, or 3, and d is 0, 1, 2, or 3, where the sum of c+d is less than or equal to 3 and in at least 50% of the units of the formula (V) c is equal to 0 or 1, C) at least 0.5 parts per 100 parts (A) of at least one aminoalkylalkoxysilane or partial hydrolysate thereof D) optionally, one of more condensation catalysts;

E) optionally, one or more water scavengers;

F) optionally, one or more adhesion promoters different from the aminoalkylalkoxysilane or partial hydrolysate thereof, and different from components C) and E);

G) optionally one or more plasticizers;

K) optionally, one or more alkoxysilyl-functional cross-linkers different from components E) and F) and having a molecular weight below 500 Da, and/or a partial hydrolysate thereof;

L) optionally, one or more antioxidants and/or UV-stabilizers;

M) optionally, one or more biocides, wherein the sand has a sieve size of from 0.037 mm to 1.0 mm.

17. The process of claim 1, wherein the silicone resin (B) is present in an amount of 74 parts to 500 parts based on 100 parts of liquid alkoxysilyl-functional polymer (A).

18. The process of claim 1, wherein the silicone resin (B) is present in an amount of 80 parts to 500 parts based on 100 parts of liquid alkoxysilyl-functional polymer (A).

* * * * *

UNITED STATES PATENT AND TRADEMARK OFFICE
CERTIFICATE OF CORRECTION

| | |
|---|---|
| PATENT NO. | : 11,299,658 B2 |
| APPLICATION NO. | : 16/345801 |
| DATED | : April 12, 2022 |
| INVENTOR(S) | : Daniel J. Mania et al. |

It is certified that error appears in the above-identified patent and that said Letters Patent is hereby corrected as shown below:

In the Claims

Column 14, Line 37, Claim 1:
After "polymer having a viscosity of less than 700"
Delete "Pas"
Insert -- "Pa·s" --.

Signed and Sealed this
Fifteenth Day of November, 2022

Katherine Kelly Vidal
*Director of the United States Patent and Trademark Office*